Patented Dec. 9, 1947

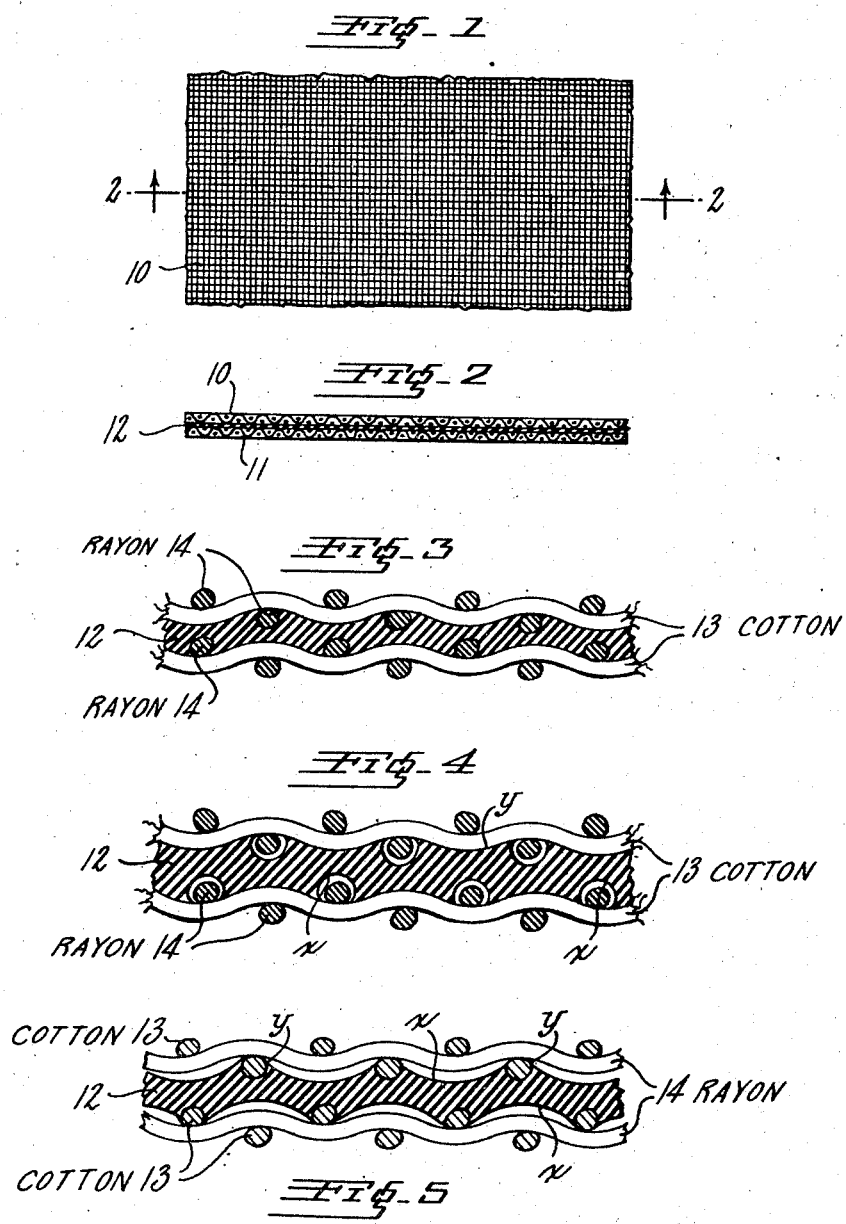

2,432,427

UNITED STATES PATENT OFFICE 2,432,427

TRANSMISSION AND CONVEYOR BELT

Herbert M. Kuhn, Clifton, N. J., assignor to United States Rubber Company, New York, N. Y., a corporation of New Jersey Application February 24, 1944, Serial No. 523,768

2 Claims. (Cl. 74—232)

This invention relates to laminated belts formed of two or more sheets of woven fabric bonded together, and more particularly to a construction for increasing the tensile strength and flexibility of such belts.

Transmission and conveyor belts employed heretofore have usually been constructed of two or more woven cotton sheets, such as cotton duck, bonded together by a layer of rubber or other elastic adhesive material. When such belts are employed to perform heavy work either as transmission belts or conveyor belts the plies of reinforcing fabric are increased as necessary to supply the required strength, but this increase in the number of plies increases the weight and stiffness of the belt, with the result that an additional amount of power is required to drive the heavier belt and to bend such belt around the pulleys.

It has been attempted heretofore to keep down the weight of such heavy duty belts by employing woven sheets of rayon as the reinforcing material in place of woven sheets of cotton, but in laminated belts it is extremely important that the reinforcing sheets be firmly bonded together so that these sheets will not separate under the various forces to which the belt may be subjected in use. If ply separation occurs the belt must be discarded. These attempts heretofore to use rayon fabric as the reinforcing plies in transmission and conveyor belts have not proved satisfactory because rubber and rubber-like materials do not bond well to rayon, and much difficulty has been experienced in securing a satisfactory bond between the rayon ply sheets. It has also been difficult to impregnate such rayon fabric satisfactorily with rubber or rubber-like material, or satisfactorily friction the surface of the fabric with these materials.

Having in mind the foregoing, the present invention contemplates a construction whereby laminated belts may be provided with the strength and other advantages contemplated by the use of rayon reinforcing plies, but the difficulty experienced heretofore in securing a firm adhesive bond between the plies of rayon fabric is overcome.

The primary feature of the present invention resides in a laminated belt employing in its construction two or more woven reinforcing sheets, each of which sheets has rayon or other strong threads to which rubber does not bond well extending in one direction, and cotton threads to which rubber bonds readily extending at right angles to such strong threads in the woven fabric.

In most cases in using such reinforcing fabric in a belt it will be desirable to arrange the rayon or other strong threads so that they extend lengthwise of the belt and the cotton threads to extend transversely of the belt. In such a construction the rubber or other bonding material will adhere firmly to the cotton threads but poorly to the rayon threads with the result that evenly distributed weak and strong bonding points will be formed between the sheets of fabric throughout the adhesive area. That is the rubber will adhere firmly to the cotton where it is exposed between the rayon threads.

Such a construction provides high tensile strength lengthwise of the belt where it is needed to prevent the belt from breaking or elongating appreciably, and also provides a novel type of bond between the fabric sheets that holds them firmly together, but permits a high degree of flexibility. That is since the rubber is bonded firmly to one set of threads but not to the other set the present belt will have greater flexibility than a similar belt in which the rubber is bonded firmly to both the warp and weft threads.

The above and other features of the present invention and advantages resulting from the present construction will be more fully understood from the following description when read in connection with the accompanying drawing wherein:

Fig. 1 is a plan view of a short piece of belt constructed in accordance with the present invention.

Fig. 2 is a section taken on the line 2—2 of Fig. 1;

Fig. 3 is a view similar to Fig. 2 but on a much larger scale.

Fig. 4 is a view similar to Fig. 3 except that the two fabric sheets are shown as pulled away from each other slightly to stretch the rubber bonding layer therebetween; and Fig. 5 is the same type of view as Fig. 4 except that the section of Fig. 4 is taken parallel to the cotton threads whereas the section of Fig. 5 is taken parallel to the rayon threads.

A transmission or conveyor belt constructed in accordance with the present invention may embody two or more plies of reinforcing fabric, depending upon the strength it is desired to impart to the belt. The belt shown in the drawing is a two ply construction having the upper woven reinforcing sheet 10 and lower woven reinforcing sheet 11. These two sheets are secured together by the layer of rubber or other elastic bonding material 12.

Each reinforcing sheet 10 and 11 may comprise a square woven sheet of duck having cotton threads to which rubber bonds well extending in one direction of the fabric, and stronger threads such as rayon, nylon, silk or glass to which rubber does not adhere readily extending at right angles to the cotton threads. In the preferred construction each reinforcing sheet 10 and 11 will be formed of cotton weft threads 13 extending transversely of the belt and rayon or other strong warp threads 14 extending longitudinally of the belt where they will serve to withstand the strong longitudinal pull exerted upon a transmission belt when driving a heavily loaded pulley, or exerted upon a conveyor belt when operating as a long or heavily loaded conveyor. The outer faces of the belt may be free of rubber, or provided with a protecting layer of rubber which is frictioned or otherwise applied to the fabric as desired depending largely upon the type of use for which the belt is designed. That is whether or not the outer face of the belt is likely to be subjected to severe wear. The fabric sheets 10 and 11 may be formed of various combinations of the cotton threads 13 and the stronger threads 14 other than that shown, and, if desired, both types of threads may be woven in parallel relation to each other in the warp or weft, or in both the warp and weft.

The important construction of any ply belt is the bond between the plies which must be strong enough to hold the reinforcing plies together when the belt operates at maximum speed or pulling force, while at the same time the bond must be sufficiently flexible to accommodate the bending of the belt as it passes around the pulleys.

After the sheets of fabric 10 and 11 and the desired amount of unvulcanized rubber or other flexible bonding material 12 have been brought together in the form of a sandwich the belt thus formed may be vulcanized in the usual press as heretofore. These vulcanizing presses usually are operated under high pressure so that the unvulcanized rubber 12 will be forced into the fabric about the exposed portions of both the cotton and rayon threads, so that if a section is taken through the belt after vulcanization as in Fig. 3 the rubber may appear to be well attached to the rayon threads 14 as well as to the cotton threads 13.

If, however, the fabric sheets 10 and 11 are forced away from each other a short distance while maintained in parallel relation to each other, as shown in Figs. 4 and 5 it will be noted that the tension thus exerted on the bonding sheet 12 will cause the rubber to sag away from the rayon threads as indicated by $x$ while it will remain firmly bonded to the cotton threads as indicated by $y$.

In the present construction the rubber bonding material 12 will so adhere to the reinforcing sheets 10 and 11 that evenly distributed weak and strong bonding points will be formed over each face of the rubber sheet. The effect of this will be to provide greater freedom of movement between the parts of the belt, as the belt bends around a pulley or assumes the shape of a trough to convey a load, than in the belts used heretofore where the entire fabric surface was adhered firmly to the rubber sheet.

In actual practice it has been found that a belt constructed in accordance with the present invention is much stronger than a belt having the same number and weight of plies but formed entirely of cotton, and the present belt has better flexing properties than a similar belt reinforced entirely of cotton. This increased flexibility of the present belt is believed to be due largely to the above described construction whereby the rubber is bonded strongly to the cotton threads where they appear at the face of the fabric but less strongly to the rayon threads.

As a result of the present invention a belt is provided which is much stronger than the cotton belts of the same weight employed heretofore, and the present belt is found to have excellent wearing properties and adhesion between the plies, and very good flexing properties. A three ply belt construction in accordance with the present invention may be used in place of a four ply belt formed entirely of cotton, the weight of a single ply being the same in each construction. This reduction in the weight of the belt makes possible a corresponding saving in the power required to drive the belt.

Having thus described my invention, what I claim and desire to protect by Letters Patent is:

1. A strong and highly flexible laminated belt formed of woven sheets of fabric bonded together by an elastic adhesive material, each woven sheet being formed of cotton threads to which the bonding material adheres firmly and rayon threads interwoven with the cotton threads and to which the bonding material adheres poorly, whereby evenly distributed weak and strong bonding points between the woven sheets and adhesive are formed throughout the adhesive area and a belt is produced of greater strength and flexibility than a belt having the same construction except that the woven sheets are formed entirely of cotton.

2. A strong and highly flexible laminated belt formed of woven sheets of fabric bonded together by an elastic adhesive material, each woven sheet being formed of cotton threads to which the bonding material adheres firmly and strong artificial textile threads interwoven with the cotton threads and to which the bonding material adheres poorly, whereby evenly distributed weak and strong bonding points between the woven sheets and adhesive are formed throughout the adhesive area and a belt is produced of greater strength and flexibility than a belt having the same construction except that the woven sheets are formed entirely of cotton.

HERBERT M. KUHN.

REFERENCES CITED

The following references are of record in the file of this patent:

UNITED STATES PATENTS

| Number | Name | Date |
|---|---|---|
| 2,179,655 | Cutler | Nov. 14, 1939 |
| 66,111 | White et al. | June 25, 1867 |
| 2,107,013 | Morgan | Feb. 1, 1938 |
| 2,064,781 | Collins | Dec. 15, 1936 |
| 2,008,353 | Geare | July 16, 1935 |

FOREIGN PATENTS

| Number | Country | Date |
|---|---|---|
| 6,106 | Austria | Aug. 1, 1901 |
| 482,774 | Great Britain | Apr. 5, 1938 |